July 16, 1940.   R. W. BROWN   2,208,540
VEHICLE SUSPENSION
Filed Oct. 17, 1938   8 Sheets-Sheet 1
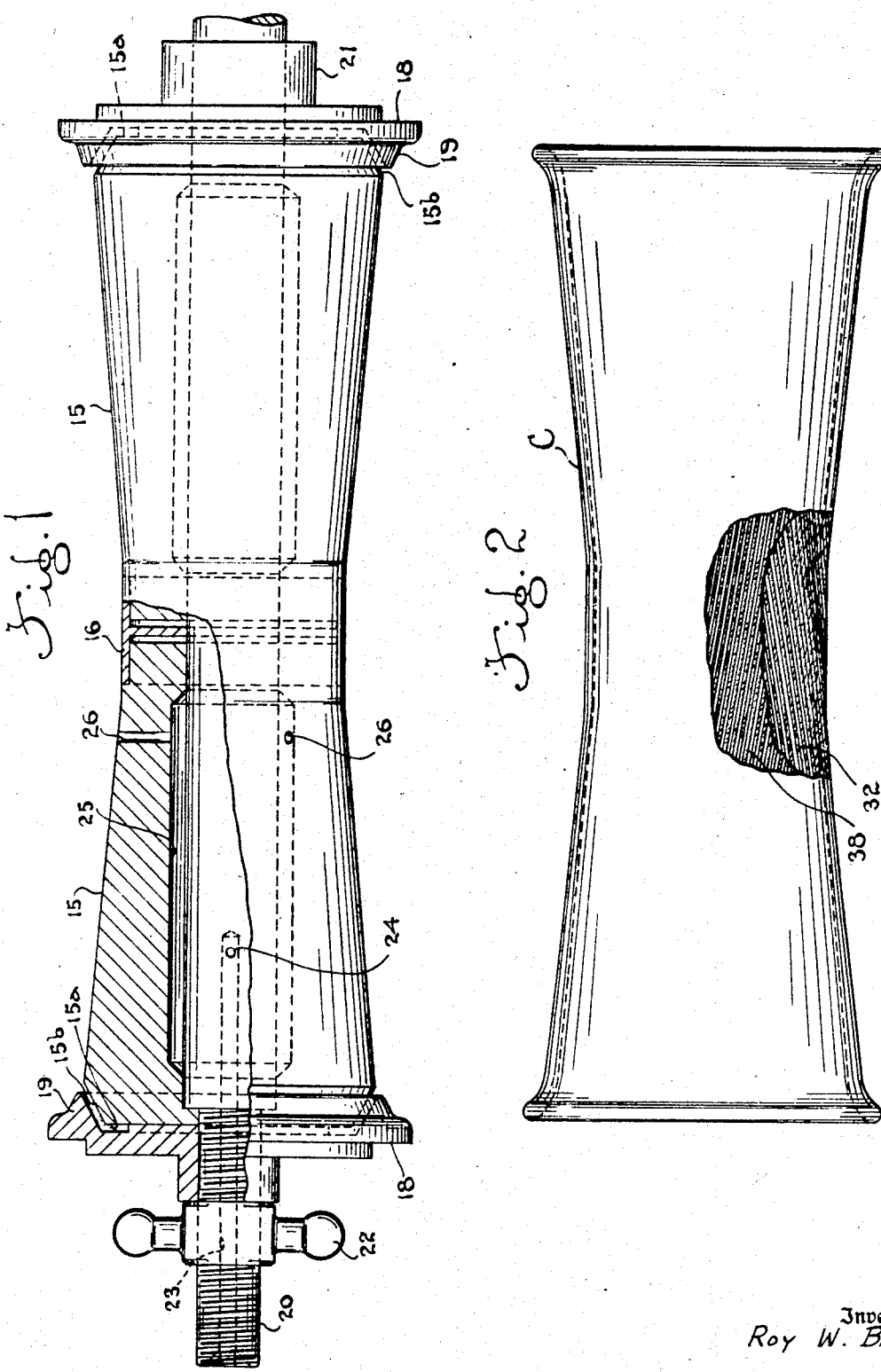
Inventor
Roy W. Brown
By Ely + Frye
Attorneys

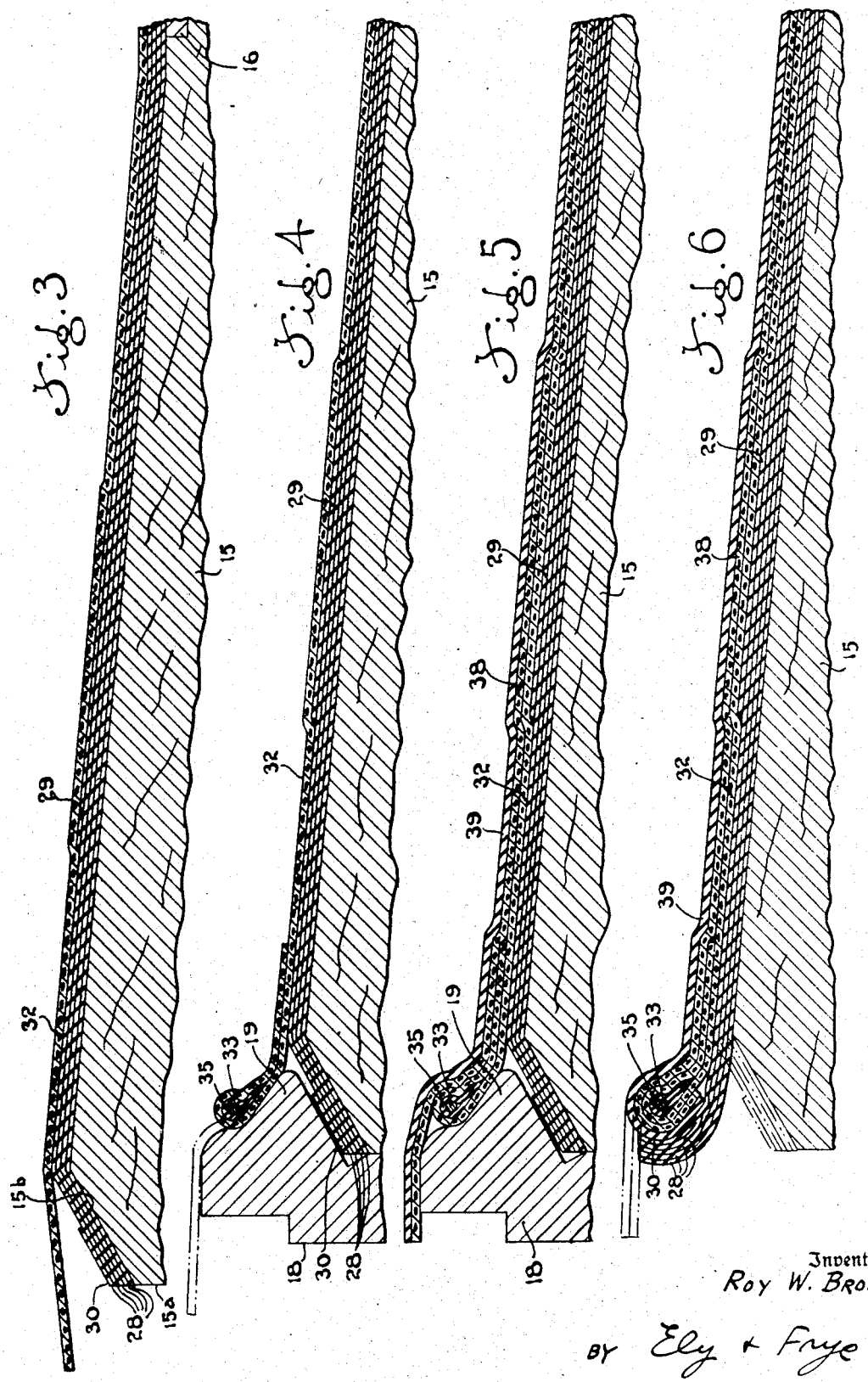

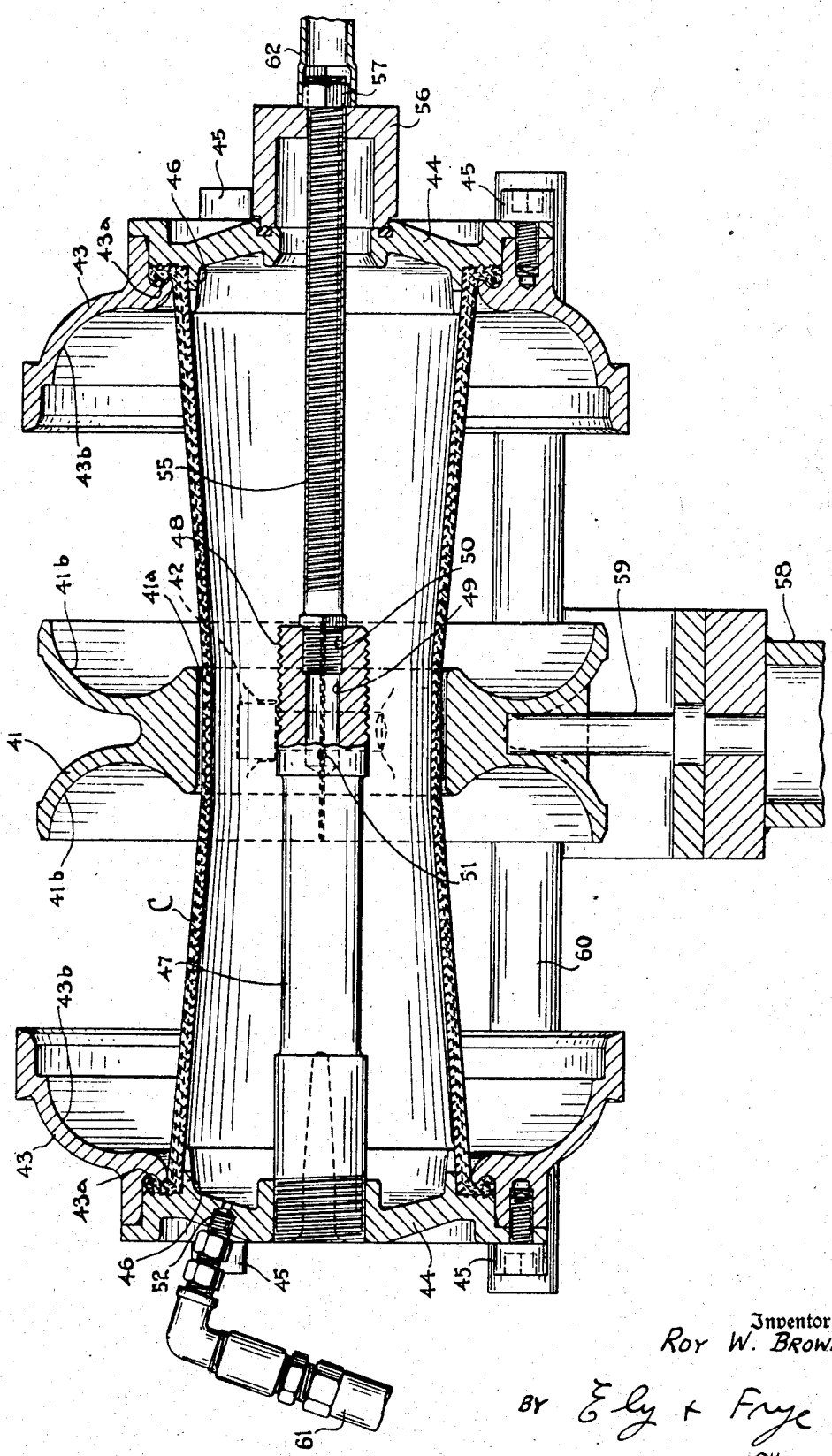

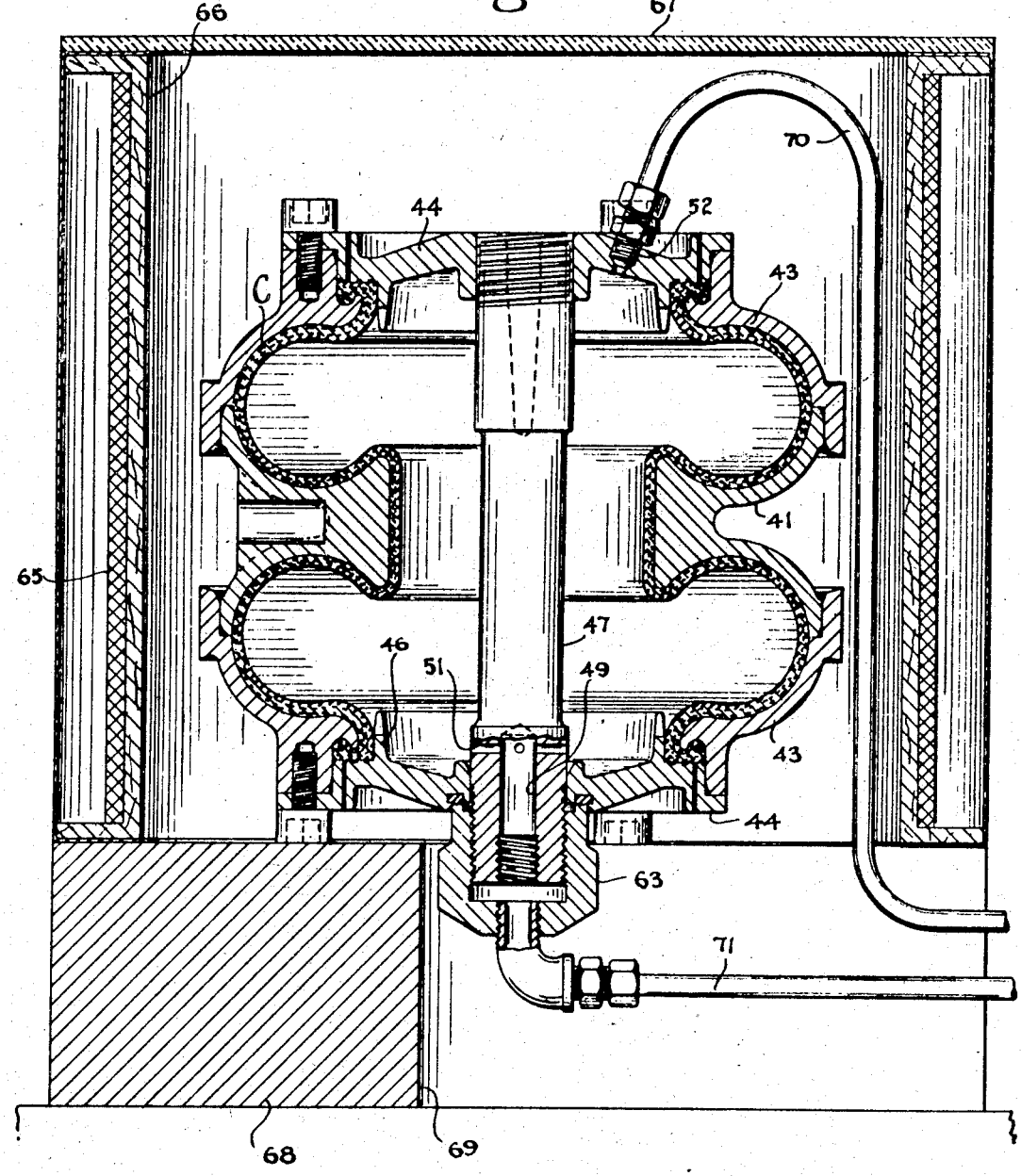

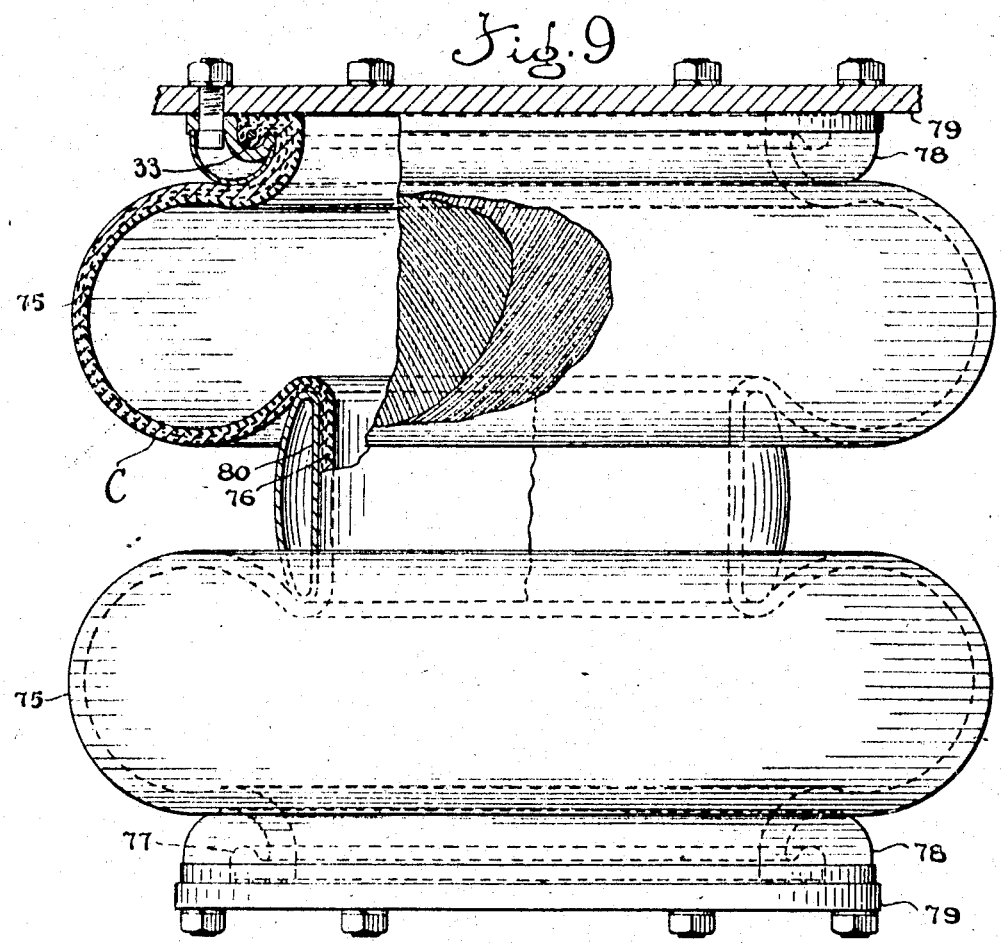
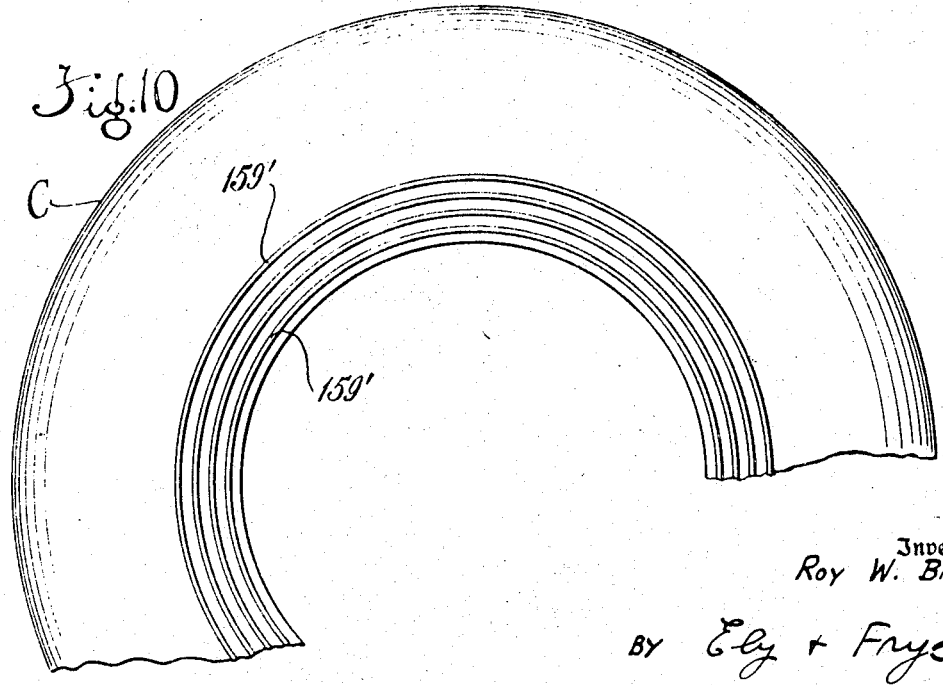

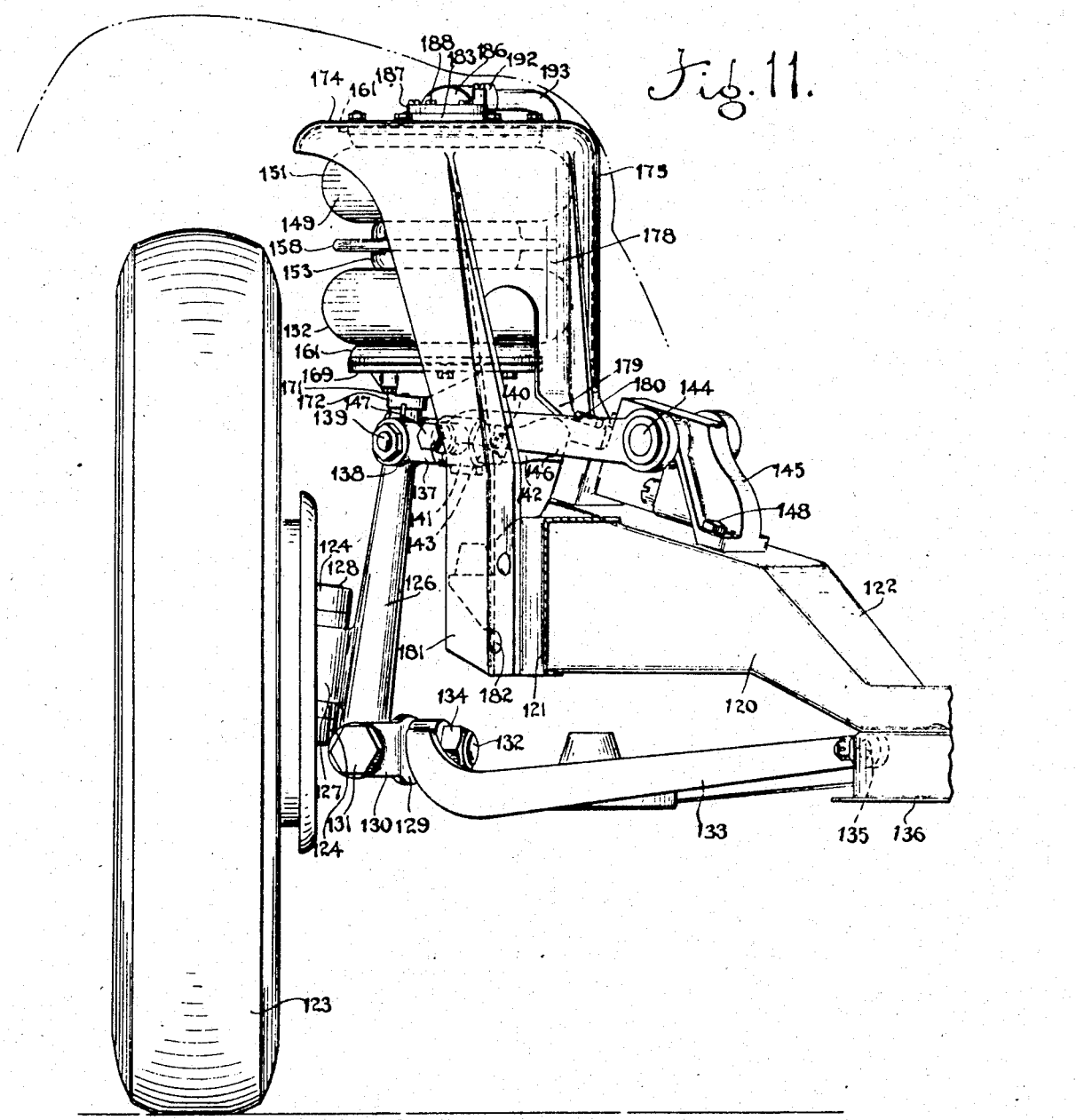

July 16, 1940.  R. W. BROWN  2,208,540
VEHICLE SUSPENSION
Filed Oct. 17, 1938  8 Sheets-Sheet 7

Inventor
Roy W. Brown
By Ely & Frye
Attorneys

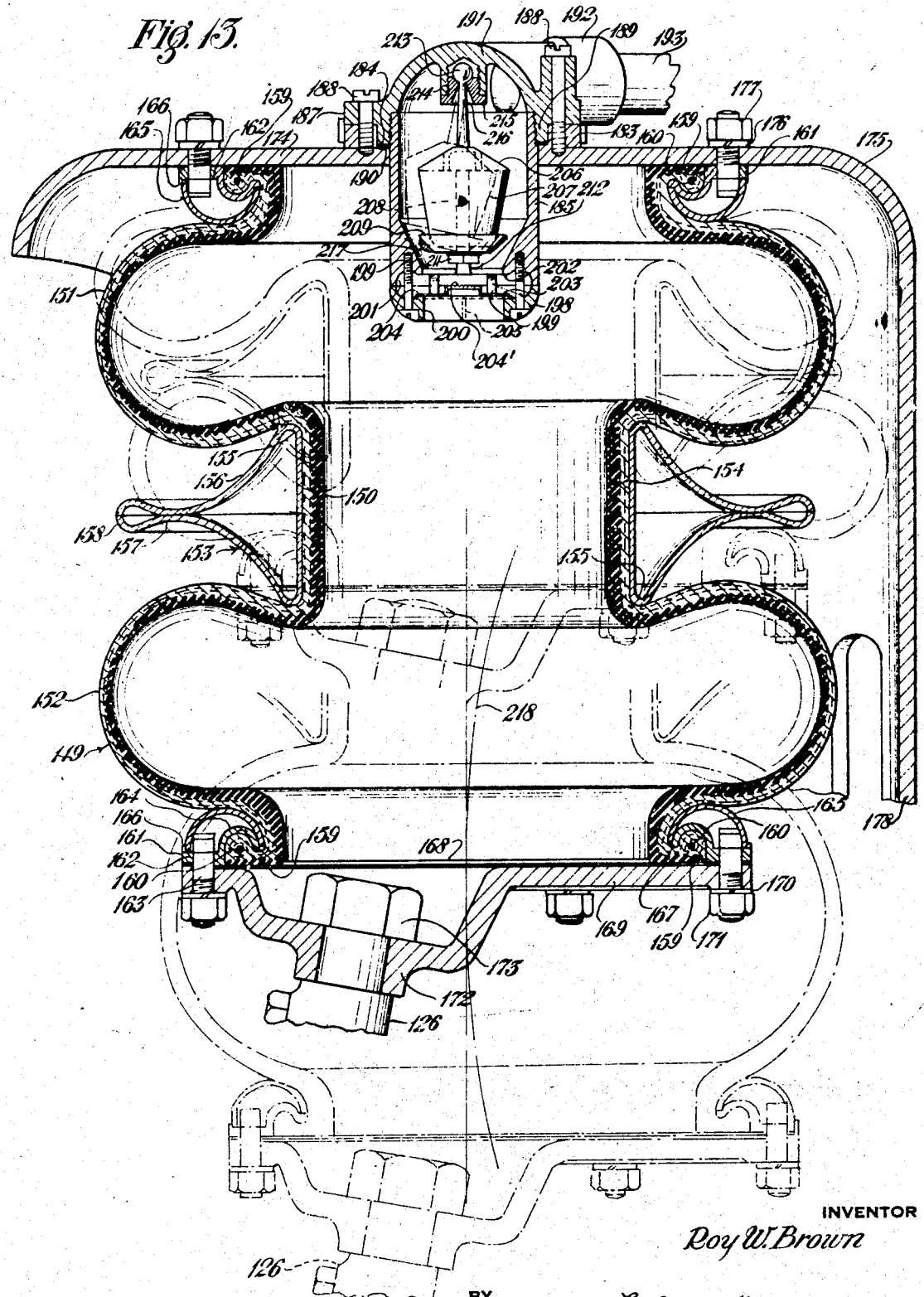

Patented July 16, 1940

2,208,540

UNITED STATES PATENT OFFICE 2,208,540

VEHICLE SUSPENSION

Roy W. Brown, Akron, Ohio, assignor to The Firestone Tire & Rubber Company, Akron, Ohio, a corporation of Ohio Application October 17, 1938, Serial No. 235,478

6 Claims. (Cl. 267—35)

This invention relates to improvements in pneumatic suspension devices adapted for use on vehicles, and further relates to the method of making same. This application is a continuation in part of application Serial No. 75,168, filed April 18, 1936.

One of the primary objects of the invention is to provide such a device which is simple in construction, inexpensive to manufacture, and efficient in operation.

Another primary object of the invention is to provide an improved bellows shaped flexible casing or pressure container comprised of vulcanized rubber reinforced with fabric, and to provide improved procedure for the expeditious manufacture thereof.

A further object is to provide a flexible casing having a plurality of spaced bulbous portions connected by an intermediate constricted portion in which the walls of said casing have a plurality of layers of reinforcing elements, the reinforcing elements of one of the layers being inclined oppositely to the elements of another of said layers, and the elements of each layer being inclined at such an angle to the axis of the casing that a casing wall structure is formed that is substantially inextensible in an axial direction.

A further object of the invention is to provide a casing of reinforced vulcanized rubber having a plurality of axially spaced convex portions integral with an intermediate restricted portion, which structure is formed from a fabricated tubular band having reinforcing elements extending from end to end thereof.

Another object is to provide an improved pneumatic suspension system for a vehicle in which the suspension comprises a flexible casing having a normally annular cross section throughout and having a restricted intermediate portion of substantial length, and arcuate convex portions integral therewith, the wall of said casing having a plurality of layers of reinforcing elements extending from end to end thereof, with the reinforcing elements of one of the layers being inclined oppositely to the elements of another of said layers, and the reinforcing elements of each layer being inclined at such an angle with respect to the axis of said casing that the wall of the casing is substantially inextensible in an axial direction, and means for attaching the ends of said casing to the parts of a vehicle to support the load serially therebetween in such a manner that the region of maximum flexing of the casing wall adjacent the point of attachment varies in position with compression and elongation of the bellows, whereby the degree of flexing of any localized area of the casing wall is reduced to increase the flexing life of the casing.

More specifically, the invention aims to provide improved procedure for assembling the rubber and fabric constituents of the container; to provide for incorporating inextensible metal rings in the respective end portions of the structure, which rings are of larger diameter than the said portions; to provide for distending the structure, in tubular form, to bellows shape; and to provide an improved method of vulcanizing the bellows-shaped container. Further objects are to shape a pulley band or drum-built article to torus form and to vulcanize same without the use of an expansible core, and with vulcanizing fluid directly in contact with the inner surface of the article.

Of the accompanying drawings:

Figure 1 is a side elevation of a building form upon which the flexible container initially is constructed, parts being broken away and in section;

Figure 2 is a side elevation of a flexible container that has been built upon the form shown in Figure 1, after its removal therefrom;

Figure 3 is a fragmentary section, on a larger scale, of a building form, and a flexible container in the first phase of construction thereon;

Figure 12:
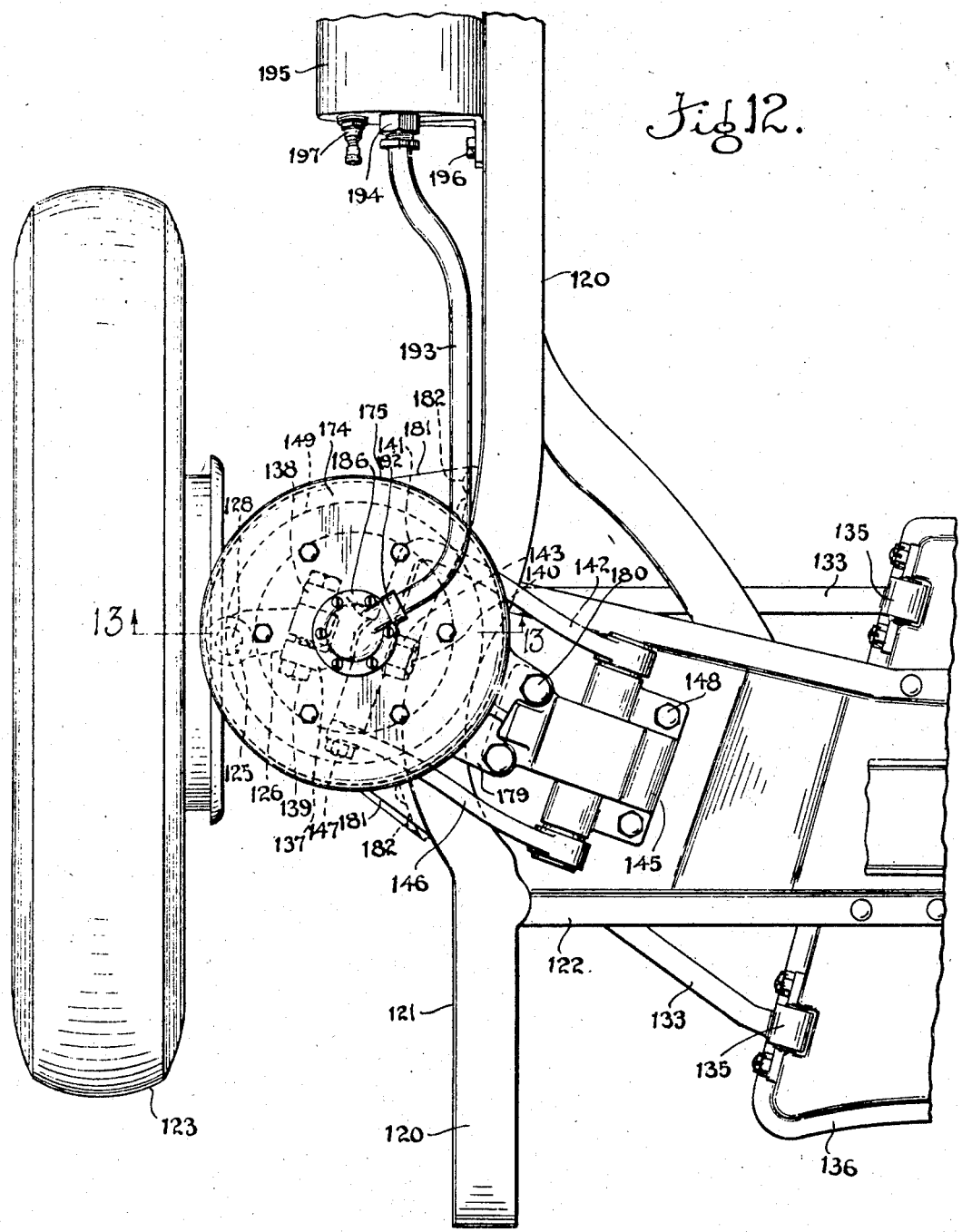

Figures 4, 5, and 6 are views similar to Figure 3 and illustrate successive subsequent phases of the construction of a container;

Figure 7 is a diametric section through a container structure such as that shown in Figure 2, and molding apparatus assembled with the container, as they appear prior to the distending of the container and the closing of the mold thereon;

Figure 8 is a diametric sectional view of the work, a closed mold within which it is confined during vulcanization, and an electrical vulcanizing apparatus in which the mold and work are received for effecting vulcanization of the latter;

Figure 9 is a side elevation of a finished container and metal fixtures adapted to be attached thereto, parts being broken away and in section;

Figure 10 is a fragmentary plan view of the pressure container illustrated in Figure 9;

Figure 11 is a front elevation view of a vehicle showing a suspension device embodying the present invention;

Figure 12 is the top or plan view of the arrangement shown in Figure 11; and

Figure 13 is a sectional elevation of Figure 12, on the line 12—12.

Referring now to Figure 1 of the drawings, there is shown a building form upon which the improved containers initially are fabricated.

Said form comprises a pair of coaxial, wooden form-sections 15, 15 that are of general frusto-conical shape and have their small ends disposed adjacent each other, said small ends being telescoped within a cylindrical metal sleeve 16 that has its peripheral surface flush with the adjacent surface of said sections 15. Each section 15 has an end face 15a at its larger end, which end face is normal to the axis of the form, and each has a frusto-conical surface 15b that is reversely tapered with relation to the major taper of the form section, and joins the latter to the end face 15a.

Coaxially abutting each end face 15a of the form are respective removable metal cap-plates 18. Each of the latter is formed on the side thereof abutting the form section with a laterally projecting circumferential flange 19 that overlies the frusto-conical surface 15b of the form section, the inner peripheral surface of said flange being tapered parallel to the said surface 15b, and being somewhat spaced therefrom. The outer peripheral surface of the cap-flange 19 is sloped reversely of the inner periphery thereof and thus flares outwardly toward the base of the flange. The form sections 15 and cap-plates 18 are formed with axial apertures, and are keyed upon a spindle 20 between a collar 21 at one end thereof and a handwheel 22 threaded upon the other end thereof. The threaded end portion of the spindle 20 is formed with an axial bore 23, and a transverse bore 24 connects the inner end of bore 23 with the surface of the spindle, said bore 24 opening into a cavity or chamber 25 formed interiorly of the form section 15. Radial bores 26, 26 in the form section connect the cavity 25 with the outer face of the section. The end portion of spindle 20 that carries collar 21 is journaled in any suitable bearing structure (not shown), and is connected to suitable driving means (not shown) by means of which the form may be rotated.

In the fabricating of a container structure upon the building form, the cap-plates 18 are not utilized in the initial phase of the building operation. The building form, without said cap-plates, is rotated upon its axis, and the respective constituent plies of rubber and rubberized fabric are fed thereonto and rolled firmly into place. The sequence and identity of the several plies will best be apparent from reference to Figures 3 to 6. The first plies to be applied to the form are of unvulcanized rubber and four in number, said plies being designated 28, 28. The plies 28 are pressed firmly onto the drum, including the tapered surfaces 15b at each end thereof, the marginal portions of the plies extending beyond the end faces 15a of the drum. Said marginal portions of the plies are then trimmed flush with the surfaces 15a as shown, the latter serving as guides for the trimming operation. Next, two relatively narrow reinforcing plies 29 of unvulcanized rubber strip material are applied circumferentially to the drum, each of said plies being positioned about mid-way between the middle of the drum and an end-face 15b thereof. A narrow strip of unvulcanized rubber 30 also is applied to the top layer 28 at each lateral margin thereof.

The next ply to be added is of weftless or weak-wefted cord fabric that is rubber-coated on both sides. This ply designated 32, is bias-cut, and is mounted on the form with its cords disposed at an angle of about 20 degrees to the axis of the form. The ply 32 is of such width that its lateral marginal portions extend substantially beyond the end-faces 15a of the form.

The ends of the ply are joined on the form in a narrow lapped splice, and the latter is covered with a thin strip of unvulcanized rubber (not shown) according to the practice in manufacturing cord tires. The ply 32 is pressed firmly to the underlying plies in the region thereof intermediate the tapered regions 15b of the form, and is left unattached from the latter regions as is most clearly shown in Figure 3.

Next a pair of endless, inextensible wire beads, such as the bead 33, are placed upon the container structure by passing them axially over the free end of the latter. The bead rings 33 are made of heavy piano wire of suitable length, and are made endless by welding together the respective ends of the wire. The bead rings may be given a light coating of rubber, if desired, by dipping them in a viscous composition of rubber and volatile solvent. The loose marginal portions of the fabric ply 32 are then flared outwardly, after which the cap-plates 18 are mounted upon the spindle 20 and secured in place against the end-faces 15a of the form, the laterally extending flange 19 of each cap-plate extending beneath the adjacent marginal portion of ply 32.

The said marginal portions of the ply 32 are then pressed down against the outer peripheral surface of the cap-flanges 19, as indicated in broken lines in Figure 4, narrow strips of unvulcanized rubber 35 applied thereto in the regions thereof that are to receive the beads 33. The bead rings 33 are then placed against the respective gum strips 35, concentrically of the form, after which the marginal portions of ply 32 are removed from the outer periphery of the cap-plates 18 and are folded over the respective bead rings 33 so as to enclose the latter, the rubber strips 35 being disposed between the bead rings and the fabric. Inwardly of the bead rings the marginal portions of ply 32 are pressed against the underlying container structure, as shown.

Thereafter, a second rubber-coated ply of cord fabric 38 is applied to the structure on the form and adhered thereto, the marginal portions of said ply 38 extending onto the outer periphery of cap-plates 18, as shown in Figure 5. The ply 38 is substantially identical to ply 32 except that it is cut on the opposite bias, with the result that the cords thereof are inclined oppositely to the cords of ply 32, as shown in Figure 2. The angle of the cords of plies 32 and 38 with respect to each other and also with respect to the axis of the finished casing shown in Figure 9, is such that the casing wall structure is substantially inextensible in an axial direction, while at the same time readily permitting change of curvature of the convex portions during compression and elongation without developing excessive stresses in the cords.

Over fabric ply 38 is mounted a ply of unvulcanized sheet rubber 39. After the several plies of the container structure are rolled down firmly the marginal portions of plies 38 and 39 are trimmed off flush with the outer end faces of the cap-plates 18, after which the latter are removed from the form.

The overhanging lateral portions of the ply 38, with rubber ply 39 adhered thereto, are then folded inwardly so as to enclose that portion of the container structure that includes the bead rings 33. Finally, those portions of the four plies 28 that lie upon tapered faces 15b of the form, and strips 30 thereon, are lifted from the form, and are distended outwardly and adhered to the adjacent, outwardly flared, bead portion of the container structure, as is clearly shown in Figure 6. This completes the fabrication of the container structure, the same hereinafter being designated C. The container structure C is loosened from the building form by fluid pressure that is admitted between the structure and form through the agency of the bores 23, 24, cavity 25 and bores 26 therein. The container structure is removed from the form by demounting the latter from the spindle 20, removing the form sections axially from the respective ends of the container, and finally withdrawing sleeve 16 from either end of the structure. The structure in its present form is ready to be mounted in a mold for the purpose of vulcanizing its rubber portions.

The mold in which the container structure C is vulcanized is best shown in Figures 7 and 8. Said mold comprises a two-piece, transversely divided, medial section 41, the respective parts of which are secured together by cap screws 42 so that it constitutes an annular structure. The structure 41 comprises a cylindrical molding surface 41a, and two annular, concentric, concave molding surfaces 41b, 41b that are disposed radially outwardly of molding surface 41a and have their inner perimeters joined to the respective ends of the said surface 41a. The mold also comprises a pair of annular sections 43, 43 disposed coaxially of mold section 41 and adapted to telescope over the outer periphery of the latter in the closed condition of the mold. Each mold section 43 includes an annular, concentric, concave molding surface 43b that is aligned with a molding surface 41b of mold section 41. The mold sections 43 include respective axially apertured closure plates 44, 44 that interfit the inner perimeters of sections 43 and are removably secured thereto by cap-screws 45, 45. Between them, each mold section 43 and its closure plate 44 defines a molding cavity 43a for the bead portion of the container structure C. At the inner periphery of each molding cavity 43a, the closure plate is formed with a circumferential flange 46 that is disposed upon the inner surface of the work for a purpose presently to be explained. One of the closure members 44 has a stem 47 permanently mounted in its axial aperture, said stem extending from the inner face of said member, toward the other member 44, and having its free end exteriorly threaded as shown at 48. The free end of stem 47 is formed with an axial bore 49 that is formed with female threads 50 at its outer end, and at its inner end a transverse bore 51 connects said bore 49 with the surface of the stem. The member 44 in which the stem 47 is mounted is formed with a threaded aperture 52 adapted to receive a pipe connection subsequently to be described.

In the operation of enclosing the container structure C within the mold, the respective halves of mold section 41 are assembled about the medial region of the container structure and clamped together by means of the screws 42, there being but slight clearance between the structure C and the molding surface 41a of the mold section. The mold sections 43 are then mounted upon the respective end portions of the structure C, which is accomplished by slightly deforming the bead portions of said structure and passing them through the axial opening of the mold section. The bead portions of the structure C are then positioned in the molding cavities 43a of the mold sections 43, and closely confined therein by mounting the closure plates 44 on the mold sections 43 and securing them in place by means of the cap-screws 45. A threaded extension 55 is then threaded into the bore 49 of stem 47, said extension projecting through the axial aperture of the opposite closure plate 44. A cap-shaped adapter 56 is mounted upon the free end portion of the extension 55, between the said closure plate and a nut 57 threaded onto said extension. The various mold parts are maintained in axial alignment by mounting them upon a suitable support comprising a standard 58 having an upwardly projecting stud 59 upon which mold section 41 is swiveled, and carrying a pair of parallel horizontal bars, such as the bar 60, which support the mold sections 43, 43 and permit axial movement thereof. A conductor pipe 61 connected with a suitable source of air under pressure (not shown) is threaded into the aperture 52 of one of the closure plates 44.

The container structure C is then distended to bellows shape by slowly admitting air to the interior thereof, under 5 to 7 pounds pressure, and concurrently moving the mold sections axially, toward each other, to confine the distended work-structure therein. The axial moving of the mold sections is accomplished by threading the nut 57 along the extension 55 by means of a suitable tool, such as the socket wrench 62. As soon as the mold is fully closed and the work therein fully distended, the air hose 61 is disconnected so as to relieve the pressure within the mold. The extension 55 and adapter 56 are then removed, and the mold retained in assembled condition by means of a cap-nut 63, Figure 8, that is mounted upon the threaded end 48 of stem 47, said end of the stem projecting through closure plate 44 in the closed condition of the mold. The work is then ready to be vulcanized, which vulcanization is effected by means of heat and internal fluid pressure. Vulcanization may be carried out in a pot heater using steam as the mold-heating medium, or the mold may be electrically heated. The latter method is described herein, apparatus for effecting vulcanization being shown in Figure 8.

The vulcanizing apparatus comprises an electric coil 65 wound upon a tubular, wooden form 66 that has a cover 67, and has a base 68 that is suitably slotted at 69 to permit necessary piping to pass therethrough. Suitable electrical controls (not shown) are provided for controlling the electrical current in the coil 65. The mold is mounted in the vulcanizer on a vertical axis, and an exhaust pipe 70 is threaded into the aperture 52, the latter being disposed at the top of the mold. A fluid pressure conductor 71 is threaded into an axial aperture formed in the cap-nut 63, at the bottom of the mold. Both pipes 70 and 71 extend through the slot 69 in the vulcanizer to the exterior thereof, where the pipe 70 is provided with a suitable shut-off valve (not shown) and the pipe 71 is connected to a three-way valve (not shown) through which air, hot water, or cold water may be admitted to said pipe and to the interior of the work in the mold.

To vulcanize the structure C, after the mold is mounted in the vulcanizer, the pipe 70 is closed and air under pressure admitted to the pipe 71, which air passes through cap-nut 63, through bores 49 and 51 in stem 47 and thence to the interior of the work. Air pressure within the mold is built up to about 80 pounds for the purpose of forcing the work into conformity with the molding cavity of the mold. Next, pipe 70 is opened and air in the mold is replaced by cold water admitted through pipe 71. As soon as the air is completely evacuated from the work, pipe 70 is closed and the hydraulic pressure is built up to 200 pounds per square inch. With the work in the condition described, the coil 65 is energized, with the result that eddy currents are set up in the metal mold to heat the same to vulcanizing temperature. This condition is maintained for about 15 minutes. Then the pipe 70 is opened and hot water at 290° F. is circulated through the work for the remainder of the vulcanizing period, which is about 30 minutes. The flange 46 on the closure plate 44 prevents the incoming hot water from impinging directly against the inner surface of the work and thus overcuring the same. After vulcanization the water is drained from the interior of the work, the mold is opened, and the finished work removed, the latter then presenting the appearance shown in Figures 9 and 10. This completes the cycle of operations.

The feature of maintaining cold water in the mold during the initial phase of vulcanization assures that vulcanization will progress from the outer surface of the work toward the inner surface thereof, with the result that the rubber about the strands of cord plies 32, 38 will be "set up" or partly vulcanized beyond the soft stage before the inner rubber plies are softened by the admission of hot water to the interior of the mold. Thus the taut reinforcing cords of the work structure are prevented from retracting during vulcanization and pulling through the inner rubber layers, with the result that the finished structure is fluid tight.

The laminating of inner plies 28 insures that the rubber lining of the container will be impervious or fluid-tight by avoiding the pin holes or porosity which occurs in a single sheet of rubber during the calendering operation. Thus the inner lining cannot be permeated by the air or water used during the shaping and vulcanizing of the container. If permeation were permitted it would cause separation of the ply structure and pocketing of air or water therein. Likewise the laminated structure insures that the final product will be an air-tight container.

As illustrated in Figure 9, the flexible pressure container comprises a pair of annular axially aligned toroidal bellows formations 75, the respective cross-sections of which extend substantially in an arc of a circle in excess of a half circle, the adjacent inner portions of said formations being joined by a central substantially tubular wall 76. The latter is of relatively large diameter such that the flow of fluid between the bellows portions is substantially unretarded. The remote marginal sides of the bellows formations are formed with respective openings defined by marginal flanges 77, 77, which flanges are adapted to be connected by suitable attaching structures, such as the annular clamping rings 78, 78, to end plates 79, 79. A girdle ring 80 may be mounted about the central, tubular wall 76 to support same. To insure maximum amplitude of axial flexure and stability with minimum cord flexure the container is preferably proportioned so that said flanged marginal openings have a diameter substantially one-half the major diameter of the bellows, and said tubular portion has a diameter substantially three-eighths the major diameter of the bellows portion and a length substantially one-fourth the normal overall length of the container.

Referring to Figures 11 and 12, a chassis 120 is shown of the usual type having longitudinally extending side channel members 121 spaced apart and rigidly connected by a front cross member 122 in any well known manner. While only the left-hand front portion of the vehicle is shown, it should be understood that the right-hand portion is substantially identical therewith so that any further showing is believed unnecessary in order to understand the invention clearly.

A wheel 123 is rotatably mounted upon a stub shaft, the inner end being bifurcated at 124 and provided with aligned openings 125. The said stub shaft is connected to the chassis 120 in any desirable manner, but preferably by the conventional parallelogram linkage comprising an upright member 126 having an integral tubular extension 127 movably positioned between the bifurcated ends 124 and secured therebetween by a pin or bolt 128 in the usual manner. A member 129 has bifurcated ends 130 which are positioned on opposite sides of the lower end of the upright member 126 and pivotally connected thereto by a bolt 131. The member 129 is further provided with a screw-threaded extension 132, on the opposite side from the bifurcated ends 130, which projects through an opening provided at the apex of a pair of angularly extending links 133, being secured thereto by a nut 134. The inner ends of the links 133 are pivotally connected at 135 with adjacent portions of a substructure 136 in turn connected to the cross member 122, more clearly shown in Figure 12.

A member 137, similar to the member 129, is also provided with bifurcated ends 138 which are positioned on opposite sides at the upper end of the upright member 126 and pivotally connected thereto by a bolt 139. The member 137 is also provided with a screw-threaded extension 140 on the opposite side from the bifurcated ends 138, which projects through an opening provided in a lateral extension 141 on a link 142 and is secured thereto by a nut 143. The inner end of the link 142 is keyed or otherwise secured to one end of a shaft 144 which is journaled in a housing 145. A link 146 has one end keyed or otherwise secured to the other end of the shaft 144 and its opposite end secured to the end of the lateral extension 141 by a bolt 147. The housing 145 is secured to the cross member 122 by a plurality of bolts 148, more clearly shown in Figure 12. With this arrangement of parallelogram linkages, the wheel 123, while held in proper position, does nevertheless have independent movement with respect to the chassis as well as with respect to the other wheels which may be similarly mounted. So much of the disclosure is standard construction on some types of vehicles at the present time, except that heretofore such assemblies have required the use of hydraulic shock absorbers, and therefore forms no part of the present invention except as the same may be included in combination with the pneumatic suspension device hereinafter described in detail.

Figure 13 shows a sectional detail of the vehicle suspension shown in Figures 11 and 12, when applied to a vehicle. The bellows 149 is made of a plurality of plies of rubber composition having reinforcing elements comprising cords which are arranged on the bias. The cords of the alternate layers are inclined opposite to each other and at such an angle with respect to the axis of the bellows as to produce a casing wall structure which is substantially inextensible in an axial direction. Generally speaking, this construction is similar to the construction previously described.

The bellows 149 is of tubular form being constricted at its central portion 150 for a considerable distance, thus providing two expansible and contractible portions 151 and 152, the former above the central portion and the latter below the central portion. A girdle ring 153 encircles the outer surface of the central portion 150 preventing any expansion thereof. This ring comprises co-operating half sections preferably formed of steel stampings and having when assembled a cylindrical inner wall 154 coextensive with the central portion 150 of the bellows. The opposite ends 155 are rounded outwardy and portions 156 are concave transversely outwardly and toward the ends of the casing, to form mating flanges 157 terminating in a peripheral bead 158 disposed substantially midway between the portions 151 and 152 of the bellows. The rounded ends 155 and the concave portions 156 are adapted to be progressively engaged by the adjacent portion of the bellows and are shaped so as to prevent sharp bending of the latter during compression or expansion.

The opposite ends of the bellows 149 have outwardly extending, circular, flanged portions 159 terminating in laterally extending peripheral beads 160 similar to the beads on tire casings. Bead rings 161, preferably of rust-proof stamped steel, have flat portions 162 provided with a plurality of openings adapted to receive attaching bolts 163 and a hook portion 164 extending inwardly and engageable with the beads 160. Inverted U-shaped rings 165 are positioned upon the inside of the bead rings 161 and have their outer ends in engagement with peripheral flanges 166 at the outside of the flat portions and their inner ends resting upon flanges 167 provided on the hook portions. The rounded portions of the U-shaped rings are adapted to contact with the adjacent portions of the bellows and should be shaped so as to prevent any sharp bending taking place in the latter during compression and expansion. The ends of the bellows 149 are provided with a plurality of circular ribs 159' spaced apart radially, there being four shown in Figure 10, although any desired number may be provided. These ribs 159' engage the end plates 168 and 174 and when the bellows 149 is secured therebetween they are compressed and function as a seal to prevent any air from escaping from the interior of the bellows.

The lower end of the bellows 149 has a plate 168 extending thereacross to effectively close the same and its outer portion is provided with openings to receive the bolts 163. An end casting 169 is provided and has openings in its outer portion to receive the bolts 163 which are provided with lock washers 170 and nuts 171 to secure the same and at the same time lock the beads 160 securely. The casting 169 has an offset portion 172 provided with an opening to receive the screw-threaded upper end of the upright member 126 and a nut 173 is provided to prevent disengagement.

The upper end of the bellows 149 is connected by the bolts 163 directly to the top portion 174 of a housing 175. Lock washers 176 and nuts 177 likewise secure the bead ring 161 in place and the bead 160 against displacement. The housing 175 has a depending arcuate portion 178 extending part way around the bellows 149 and adjacent its mid portion the lower end is flared outwardly at 179. Openings are provided in the flared portion 179 in alignment with the openings in the housing 145 and receive bolts 180 by which it is rigidly secured. At the outer ends of the depending portion 178 extensions 181 are provided which likewise have openings in alignment with openings in the chassis and receive bolts or rivets 182 to provide a rigid structure. The relative position of a fender is shown in dot and dash lines in Figure 11.

The top portion 174 of the housing 175 has an opening therein which is substantially coaxial with the axis of the bellows 149 and a flange 183 surrounds the same on the outer side but is spaced slightly therefrom to provide a seat 184. A tubular valve casing 185 of suitable diameter has its upper end positioned in the opening in the top portion 174 and its lower end projecting into the bellows 149. A portion of the casing 185 extends beyond the top portion 174 and is exteriorly screw-threaded. A cover member 186 has an interiorly screw-threaded opening to receive the screw-threaded end of the valve casing 185 and a lateral flange 187 resting upon the flange 183, there being aligned openings in both to receive bolts 188. The cover member also has a depending flange 189 which securely engages a rubber washer or gasket 190 positioned upon the seat 184 to seal the same.

The cover member 186 has a hooded portion 191 provided with a tubular projection 192 within which one end of a tube 193 is secured. The opposite end of the tube 193 is secured to a connection 194 provided upon a fluid reservoir or receptacle 195 which is secured by bolts 196 to the side of the frame member 120 or at any other desirable location. This reservoir is of any desired size and is provided with a valve 197 through which fluid, such as air, may be introduced into the reservoir and from which the fluid is prevented from escaping. The reservoir 195 is in communication with the interior of the bellows 149 and consequently the latter is inflated in this manner to the desired static pressure, depending upon the load which it is required to support.

Although various types of valve mechanism may be employed, the preferred construction is shown in Figure 13. At the bottom of the valve casing 185 is a cap 198 removably secured thereto by bolts 199. The cap has a central opening 200 and complementary recesses are provided in the adjacent portions of the cap and casing to provide a circular chamber 201 positioned concentrically and outwardly of the opening 200. This provides an upper valve seat 202 on the casing and a lower valve seat 203 on the cap which are spaced apart and in parallelism. A light-weight, hardened steel, disc valve 204 is freely positioned in the space between the valve seats 202 and 203 and is adapted to be moved into engagement with either so as to interrupt the free communication between the bellows 149 and reservoir 195 in a manner to be later described. One or more small openings 205 are provided in the outer portion of the cap to by-pass a small quantity of air around the disc valve 204 when engaging the lower valve seats 203. This disc valve 204 has a raised central portion 204' of definite size.

A valve control member 206 is mounted within the casing 185 and in this instance is of the pendulum type. It consists of a lead weight body portion 207 of approximately frusto-conical shape with the smaller end disposed downwardly and in coaxial alignment with the valve seats when in normal position as shown in Figure 13, it being also spaced from the inner wall of the casing. The body 207 has an axial opening extending therethrough within which one end of a rod 208 is disposed. A cup-shaped rubber member 209 has a brass ferrule 210 secured axially thereof and is mounted upon the lower end thereof, the end of the rod extending through the ferrule and being exteriorly screw-threaded to receive a clamping nut 211. The lower end of the rod 208 has an extension 212 which is adapted to engage the raised portion 204' of the disc valve 204 to hold the valve out of engagement with the upper valve seat 202 when the valve member 206 is in normal vertical position.

The upper end of the rod 208 is formed with a spherical knob 213 disposed within a tubular extension 214 projecting inwardly from the cover 186. This tubular extension is interiorly screw-threaded to receive an exteriorly screw-threaded split plug 215 which has a conical opening 216 therethrough, through which that portion of the rod 108 below the spherical knob 213 extends. The plug 215 is adjustable to retain the spherical knob 213 in position, but such adjustment should permit free and easy movement of the weighted body 207 about the knob as an axis. The flaring edge of the rubber member 209 surrounds the lower end of the weighted body 207 and thereby functions as a noiseless bumper when the body swings into engagement with the inner wall of the casing 185. A pin 217 has its ends secured in the wall of the casing 185 and is positioned to prevent the weighted body 207 from swinging in its direction.

In the operation of the pneumatic suspension device it will be assumed that a sufficient air pressure has been established in the reservoir 195 and that therefore the same air pressure is established in the bellows 149 inasmuch as the pendulum valve 206 is normally in vertical position with the result that the disc valve 204 is held out of engagement with the upper valve seat 202, thereby establishing free communication between the reservoir and bellows. Furthermore, the air pressure established in the bellows should be sufficient to support the static load of the vehicle body which, for purpose of example, is approximately 400 pounds, although this load naturally differs on different makes of cars, and with the normal overall height of the bellows under this load about equal to the difference between its maximum and minimum positions of expansion and contraction. With this relationship the parts assume the shape and appear as shown in full lines in Figure 13.

By taking advantage of the characteristic of increasing rate with deflection, "bottoming" can be eliminated while still retaining extremely "soft" rides on all lesser deformations. In the suspension shown in Figure 13, this is obtained by providing a diameter of the constricted portion 150 of the bellows slightly less than the diameter of the beads 160 and then providing rounded portion 165 on the bead rings and rounded portions 155 on the girdle ring 153 which progressively engage adjacent portions of the bellows during deflection of the latter so that the rate increases on compression or extension from some mid-length the exact value of which is determined by the size reservoir used. To increase this rate to an even greater degree to prevent "bottoming", the girdle ring 153 has the concave portions 156 and the lateral circumferential flange provided with grooved flanges 157 and the peripheral bead 158 positioned so as to be engaged by the adjacent portions of the bellows upon excessive compression such as is shown in dot and dash lines in the upper portion of Figure 13. Thus when a wheel hits a road obstruction, which would ordinarily cause complete compression of the bellows to the point of bottoming, the compression of the bellows is increasingly resisted by engagement of the latter with the concave surfaces 156, flanges 157 and bead 158 of the girdle ring 153 with the result that rate of resistance to the compression of the bellows is built up rapidly enough to stop the complete compression and thus prevent bottoming.

It will be further noted that the movement of the bellows 149 during the compression stroke is not in a vertical direction along the normal axis. This is because of the unequal length of the upper and lower parallelogram arms and the relative positions of points of rotation which results in the bottom casting 169 moving from the position shown in full lines in Figure 13 about an arc 218 to the position shown in dot and dash lines. Due to this arcuate movement, the bellows 149, in the suspension, during its compression stroke has the lower right side of the portion 151 engageable with the upper adjacent portion of the flange on the girdle ring 153 while the upper left-hand side of the portion 152 is engageable with the lower adjacent portion of the flange on the girdle ring 153, or in other words the engagement is on diagonally opposite sides of the flange on the girdle ring 153, as viewed in Figure 13. This engagement, however, builds up pressure sufficient to retard and resist the relative movement between chassis and wheels to prevent "bottoming."

The smooth dampening characteristic of moving air through a closed system effectively augments the natural functional dampening of the chassis, thus further reducing the need for shock absorbing devices.

Of course when the bellows 149 is compressed under ordinary operating conditions, the pendulum 206 is substantially perpendicular as shown in Figure 13 with the result that the disc valve 204 is prevented from engagement with the upper valve seat 202 and communication between the bellows and reservoir 195 is maintained, the movement being increasingly resisted and the shock absorbed. Upon the rebound stroke, the disc valve 204 is moved into engagement with the lower valve seat 203 which shuts off communication and the movement is likewise retarded, but in this instance ports 205 permit the passage of some of the air from the tank to the bellows so as to control the rate of retardation.

The overturning movement occurring in rounding curves has been heretofore determined. The "soft" independent front suspension placed on passenger cars recently aggravated the condition to such an extent as to result in definite unfavorable reactions to the driving public. The insertion of a valve between the bellows 149 and tank 195, arranged to close when a pendulum above the valve swings outwardly by centrifugal force from rounding curves, makes available for resisting the overturning movement the much higher rate of the bellows alone. For example, referring to Figure 13, when the vehicle rounds a curve, the pendulum 206 swings to one side as indicated in dotted lines, thus moving the extension 212 out of engagement with the raised portion 204' on the disc valve 204, permitting the latter to engage the upper valve seat 202 to shut off communication between the bellows 149 and tank 195. The angular rotation of the chassis is therefore retarded by the higher compression rate of the bellows without reservoir in the manner heretofore explained.

The valve construction above described may be so mounted on the vehicle that the nosing down tendency of the front of the body resulting from application of the brakes will be substantially minimized. To this end the raised portion 204' on the disc valve 204 is so shaped that when the pendulum 206 swings forward upon deceleration of the car the raised portion will clear the extension 212. This permits the disc valve 204 to be moved into engagement with the upper valve seat 202, thus shutting off communication between the bellows 149 and tank 195. Upon compression of the front bellows the rate of the suspension will increase very rapidly, due to the fact that the air is trapped in the bellows. Also, due to the shape of the girdle ring, as above described, the rate is further increased and consequently the nosing down action of the front of the vehicle is substantially minimized. The construction and arrangement of the valve and pendulum is such that when the vehicle travels in a curved path the disc valve 204 is permitted to move into engagement with the upper valve seat 202 to shut off communication between the bellows 149 and tank 195 to increase the rate of the bellows and minimize the side rolling action of the vehicle body. It is also to be understood that on the rear of the vehicle the valves are so arranged that the rate of the suspension will increase when the vehicle is accelerated at a high rate so that compression of the bellows will be minimized under such conditions.

While I have described the preferred embodiments of the invention, it should be understood that I am not to be limited thereto inasmuch as changes and modifications may be resorted to without departing from the spirit of the invention as defined in the appended claims.

What is claimed is:

1. A flexible fluid pressure container adapted to be mounted between rigid attaching means, said container comprising flexible wall portions formed of a plurality of plies of rubber and cord fabric, the cords of one ply lying at an angle to the cords of an adjacent ply, said wall portions including a pair of annular axially aligned bellows formations, the respective cross-sections of which extend substantially in the arc of a circle in excess of a half-circle, the adjacent radially inner portions of said formations being joined by a substantially cylindrical tubular wall, said tubular structure being of relatively large diameter such that the flow of fluid between the bellows formations is unrestricted, the remote sides of said bellows formations being provided with flanged marginal openings for co-operating with said attaching means, the interior of said container and the outer faces of said flanged end portions being provided with an impervious layer of rubber, said flanged marginal openings having a diameter substantially one-half the major diameter of the bellows, said tubular portion having a diameter substantially three-eighths the major diameter of the bellows portion and a length substantially one-fourth the normal overall length of the container.

2. A flexible fluid pressure container adapted to be mounted between rigid attaching means, said container comprising flexible wall portions formed of a plurality of plies of rubber and cord fabric, the cords of one ply lying at an angle to the cords of an adjacent ply, said wall portions including a pair of annular axially aligned bellows formations, the adjacent radially inner portions of said formations being joined by a substantially cylindical tubular wall, said tubular structure being of relatively large diameter such that the flow of fluid between the bellows formations is unrestricted, the remote sides of said bellows formations being provided with flanged marginal openings for co-operating with said attaching means, the interior of said container and the outer faces of said flanged end portions being provided with an impervious layer of rubber.

3. A pneumatic suspension for a vehicle having a body or frame structure and running gear, said suspension comprising a deformable, unitary, generally tubular, flexible casing, said casing normally having annular cross-sections throughout and having a restricted intermediate portion of substantial length and arcuate convex portions extending axially on either side of said cylindrical intermediate portion, said convex portions terminating in circumferentially inextensible ends having diameters less than the normal outside diameter of said convex portions, means for attaching the ends of said casing to parts of said vehicle to support the load serially therebetween and to permit substantially uniform arcuate flexing and substantially equal change of cross-sectional contour of each of the convex arcuate portions between the respective ends thereof, the wall of said casing having a plurality of layers of reinforcing elements extending from end to end thereof between said inextensible ends, the reinforcing elements of one of said layers being inclined oppositely to the elements of another of said layers and the reinforcing elements of each layer being inclined at such an angle to the axis of said casing that a casing wall structure is formed which is substantially inextensible in an axial direction.

4. A pneumatic suspension for a vehicle having body or frame structure and running gear, said suspension comprising a deformable, unitary, generally tubular, flexible casing adapted for holding a compressible fluid under pressure, said casing normally having annular cross-sections throughout and having a restricted, intermediate, radially inextensible portion of substantial length and arcuate convex portions extending axially on either side of said restricted intermediate portion, said convex portions terminating in circumferentially inextensible ends having diameters less than the normal outside diameter of said convex portions, the wall of said casing having a plurality of layers of reinforcing elements extending from end to end thereof between said inextensible ends, the reinforcing elements of one of said layers being inclined oppositely to the elements of another of said layers and the reinforcing elements of each layer being inclined at such an angle to the axis of said casing that a casing wall structure is formed which is substantially inextensible in an axial direction, means for operatively associating the ends of said casing with said frame or body and said running gear to support the load serially therebetween, means extending from the region contiguous with said ends having surfaces convex toward the convex portions of said casing and so constructed and arranged as to engage said convex portions during axial compression of said casing whereby flexing of the wall of said casing contiguous to the point of attachment to the parts of the vehicle is prevented and whereby the length of the convex portions which is free to flex under the influence of the internal fluid pressure is progressively reduced and the curvature of the casing wall is gradually and progressively changed from convex transversely to convex axially of said casing, the relative length of said intermediate portion and the axial extent of said convex portions being such that upon compression of said casing the convex portions axially overlap said restricted portion progressively from the ends thereof.

5. A pneumatic suspension for a vehicle having body or frame structure and running gear, said suspension comprising a deformable, unitary, generally tubular, flexible casing, said casing normally having annular cross-sections throughout and having a restricted, intermediate, radially inextensible portion of substantial length and arcuate convex portions extending axially on either side of said restricted intermediate portion, said convex portions terminating in circumferentially inextensible ends having diameters less than the normal outside diameter of said convex portions, the wall of said casing having a plurality of layers of reinforcing elements extending from end to end thereof between said inextensible ends, the reinforcing elements of one of said layers being inclined oppositely to the elements of another of said layers, and the reinforcing elements of each layer being inclined at such an angle to the axis of said casing that a casing wall structure is formed which is substantially inextensible in an axial direction, means for operatively associating the ends of said casing with said frame or body and said running gear to support the load serially therebetween, means extending from the region contiguous with said ends having surfaces convex toward the convex portions of said casing and so constructed and arranged as to engage said convex portions during axial compression of said casing whereby flexing of the wall of said casing contiguous to the point of attachment to the parts of the vehicle is prevented and whereby the length of the convex portions which is free to flex under the influence of the internal fluid pressure is progressively reduced and the curvature of the casing wall is gradually and progressively changed from convex transversely to convex axially of said casing, a floating girdle ring surrounding said restricted portion and having surfaces concave transversely outwardly and toward the ends of the casing, the relative length of said intermediate portion and the axial extent of said convex portions being such that upon compression of said casing the convex portions axially overlap said restricted portion progressively from the ends thereof and progressively engage said concave surfaces of said girdle ring.

6. A pneumatic suspension for vehicles having a frame structure and running gear, said suspension comprising a deformable, unitary, generally tubular, flexible casing, said casing normally having annular cross sections throughout and having a restricted intermediate portion of substantial length and arcuate convex portions extending axially on each side of said cylindrical intermediate portion, said convex portions terminating in circumferentially inextensible ends adapted to be attached to parts of the vehicle, means for attaching the ends of said casing to parts of said vehicle to support the weight of the vehicle serially therebetween and to permit substantially uniform arcuate flexing and substantially equal change of cross sectional contour of each of the convex arcuate portions between the respective ends thereof, the wall of said casing having a plurality of layers of reinforcing elements extending from end to end thereof between said inextensible ends, the reinforcing elements of one of said layers being inclined oppositely to the elements of another of said layers and the reinforcing elements of each layer being inclined at such an angle to the axis of said casing that a casing wall structure is formed which is substantially inextensible in an axial direction.

ROY W. BROWN.